United States Patent [19]
Ide

[11] Patent Number: 5,275,493
[45] Date of Patent: Jan. 4, 1994

[54] PLAIN BEARING WITH MULTIPLE LOAD BEARING SURFACES

[76] Inventor: Russell D. Ide, P.O. Box 744, 641 Arnold Rd., Conventry, R.I. 02816

[21] Appl. No.: 872,323

[22] Filed: Apr. 23, 1992

[51] Int. Cl.⁵ .............................. F16C 17/02
[52] U.S. Cl. ..................... 384/103; 384/302
[58] Field of Search ............... 384/302, 901, 461, 125, 384/103

[56] References Cited

U.S. PATENT DOCUMENTS 2,217,200 10/1940 Fast ....................... 384/302
3,920,293 11/1975 Takeuchi .................. 384/302

*Primary Examiner*—Lenard A. Footland
*Attorney, Agent, or Firm*—Michael D. Bednarek

[57] ABSTRACT

A bearing which includes a series of spaced bearing surfaces so as to distribute load amongst a series of spaced bearing surfaces thereby increasing the load carrying capacity of the assembly. The bearing surfaces are formed of a high PV material. The bearing assembly can be either a radial bearing for supporting radial loads or a thrust bearing for supporting thrust loads.

15 Claims, 2 Drawing Sheets

PLAIN BEARING WITH MULTIPLE LOAD BEARING SURFACES

FIELD OF THE INVENTION

The present invention relates to an unlubricated plastic sleeve bearing construction having multiple load bearing surfaces to increase the load capacity of the bearing.

BACKGROUND OF THE INVENTION

Unlubricated plastic sleeve bearings are sometimes used as an alternative to expensive ball bearings. Perhaps the biggest advantage of plastic sleeve bearings is their remarkably low cost compared to roller bearings. There are, however, also performance advantages. Sleeve bearings require less radial space than roller bearings. They are better able to withstand shock conditions and have less difficulty with fatigue. Sleeve bearings are also much more quiet in operation than roller bearings.

The principal limitation in a sleeve bearing's performance is the so-called PV limit. PV is the product of load or pressure (P) and sliding velocity (V). A sleeve bearing subjected to increasing PV loading will eventually reach a point of failure known as the PV limit. For instance, high edge loading causes a sleeve bearing to reach its PV limit. The failure point is usually manifested by an abrupt increase in the wear rate of the bearing material.

As long as the mechanical strength of the bearing material is not exceeded, the temperature of the bearing surface is generally the most important factor in determining PV limit. Therefore, anything that affects surface temperature—coefficient of friction, thermal conductivity, lubrication, ambient temperature, running clearance, hardness and surface finish of mating materials—will also affect the PV limit of the bearing.

Thus, the first step in selecting and evaluating a sleeve bearing is determining the PV limit required by the intended application. It is usually prudent to allow a generous safety margin in determining PV limits, because real operating conditions often are more rigorous than experimental conditions Determining the PV requirements of any application is a three step process First, the static loading per unit area (P) that the bearing must withstand in operation must be determined. For journal bearing configurations, the calculation is as follows:

$$P = W/(d \times b)$$

P = pressure, psi(kg/cm$^2$)
W = static load, lb(kg)
d = bearing surface ID, in.(cm)
b = bearing length, in.(cm)

Pressure (P) should not exceed certain maximum values at room temperature. These can be derived from a table of allowable static bearing pressure for most known materials. Next, the velocity (V) of the bearing relative to the mating surface must be calculated. For a journal bearing experiencing continuous rotation, as opposed to oscillatory motion, velocity is calculated as follows:

$$V = (dN)(\pi)$$

where:
V = surface velocity, in/min(cm/min)
N = speed of rotation, rpm or cycles/min
d = bearing surface ID, in.(cm)

Finally, calculate PV as follows:

$$PV(\text{psi-ft/min}) = P(\text{psi}) \times V(\text{in/min})12 \text{ or, in metric units:}$$

$$PV(\text{kg/cm}^2 - \text{m/sec}) = P(\text{kg/cm}^2) \times V(\text{cm/min})/6000$$

The PV limits of unlubricated bearing materials are generally available from the manufacturer of the material or from technical literature. Since PV limits for any material vary with different combinations of pressure and velocity as well as with other test conditions, it is prudent to consult the manufacturer for detailed information.

One material which is particularly well suited to bearing applications is the polyimide thermoset material sold by Hoechst Celanese under the trademark CELAZOLE ™. Properly lubricated CELAZOLE ™ parts can withstand approximately 1 million psi-ft/min.

Despite the availability of new high performance materials such as CELAZOLE ™ and the advantages sleeve bearings offer, sleeve bearings are still not used in many applications. This is believed to be due in part to the load limits of such bearings. Accordingly, there remains a need for improved sleeve bearings.

SUMMARY OF THE INVENTION

The present invention relates to an improved sleeve bearing assembly constructed such that load is distributed amongst two or more surfaces instead of one. By virtue of this construction, the load-carrying ability of the bearing is greatly increased. For example, if the load is distributed amongst five separate sleeves, the load carrying ability of the bearing should be increased several times. This is because any particular bearing surface PV limit depends on the load applied to that surface.

The bearing assembly includes two relatively rotatable members: a static or non-rotatable member and a rotatable member. The non-rotatable member is typically mounted in the housing and may be locked against rotation within the housing. The non-rotatable member includes a plurality of radially spaced coaxial extensions. The surfaces of the coaxial extensions are preferably cylindrical.

The rotatable member is typically secured to the shaft for rotation therewith. The rotatable member includes a radially spaced coaxial extension. The extensions of the rotatable member are spaced such that they can be interlocked with the extensions of the non-rotatable member.

In the assembled state, the cylindrical extensions of the rotatable member are overlapped by the spaced extensions of the non-rotatable member to provide distinct sets of overlapping cylindrical surfaces. A bearing sleeve of high PV material is provided between each set of overlapping surfaces to support the rotatable member for rotation.

When the rotatable and non-rotatable members are assembled, they define an interlocking construction in which the cylindrical portions of the rotatable member are separated from one another by the cylindrical portions of the non-rotatable portion and vice versa with a plurality of sliding surface interfaces are provided within the interlocking structure. The first sliding surface interface is between the inner extension of the non-rotatable member and the inner cylindrical portion of the rotatable member. The next sliding surface interface is between the second extension of the rotatable member and the inner cylindrical portion of the rolling member. The third sliding surface interface is between the second extension of the rotatable member and the second cylindrical portion of the rotatable member and so on.

The bearing sleeves located at each sliding surface interface should ensure smooth sliding between the relatively moving surfaces. It is therefore preferable to use sleeve bearings with a low coefficient of sliding friction formed of a material having a high PV, such as CELAZOLE TM. Each sleeve bearing is secured to one of the two relatively moving surfaces and rotatable with respect to the other surface. To simplify construction, all of the sleeve bearings are preferably secured to either the rotatable member or to the non-rotatable member and rotatable with respect to the other member.

DETAILED DESCRIPTION OF THE INVENTION

Figure 1:
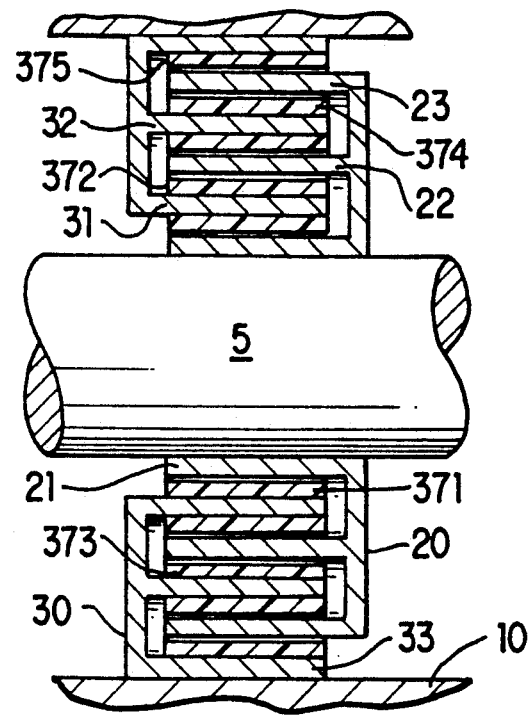
FIG. 1 is an assembled axial section of a radial bearing assembly according to the present invention.
Figure 1B:
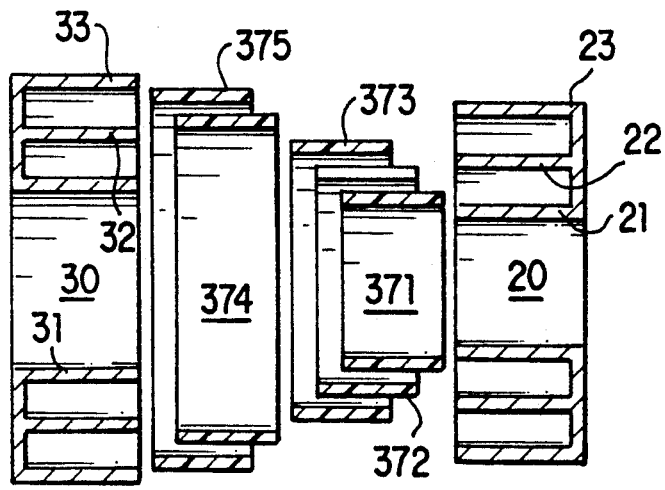
FIG. 1B is an exploded axial section view of the bearing assembly of the coupling of the present invention.
Figure 1A:
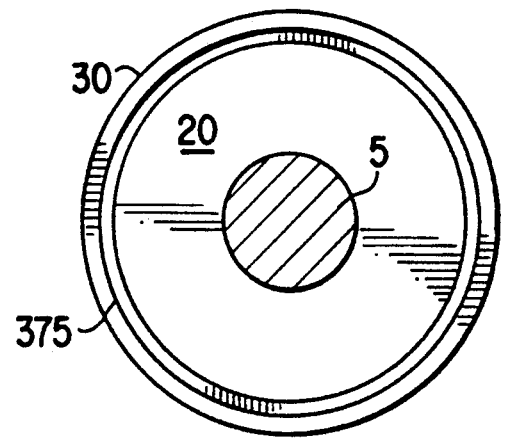
FIG. 1A is a plan view of the bearing assembly of FIG. 1.

FIGS. 1, 1A and 1B depict a radial bearing assembly for supporting a shaft 5 for rotation with respect to a housing 10. The bearing assembly includes a rotatable member 20 and a non-rotatable member 30.

As shown in FIG. 1, the rotatable member 20 is provided with a plurality of, in this case three, coaxial cylindrical extensions 21, 22 and 23. The non-rotatable member 30 is likewise provided with a plurality of, in this case three, coaxial cylindrical extensions 31, 32 and 33. The coaxial extensions of the rotatable member 20 and the non-rotatable member 30 are radially spaced such that the non-rotatable member 20 and the rotatable member 30 can be interlocked as shown in FIG. 1 whereby the extensions of the non-rotatable member 30 overlap the extensions of the rotatable member 20. As shown, the radially innermost extension 31 of the non-rotatable member 30 extends between the extensions 2; and 22 of the rotatable member. The second or middle radial extension 32 of the non-rotatable member 30 extends between the second and third radial extensions 22 and 23 of the rotatable member and the radially outermost radial extension 33 of the non-rotatable member overlaps the radially outermost extension 23 of the rotatable member.

The rotatable member 20 is secured to the shaft 5 by splines, keys or a suitable adhesive or pressfitting. The non-rotatable member 30 is preferably secured to the housing by splines, keys, pressfitting or a suitable adhesive or the like.

The rotatable and non-rotatable members 20 and 30 are preferably formed of a relatively rigid material such as metal so as to provide resistance to deflection. Alternatively, one of the two pieces could be made of plastic to permit injection molding and the other piece could be made of metal. Indeed, if desired, the plastic could be formed integrally to the member to which they are secured to provide a one-piece sleeve and extension construction.

In accordance with the present invention, a bearing sleeve is provided between each pair of relatively movable surfaces of the interlocking coaxial extensions of the rotatable member 20 and the non-rotatable member 30. In this case, the bearing sleeves 371, 372, 373, 374 and 375 are secured to the non-rotatable member as shown in FIG. 1. Naturally, if desired, the bearing sleeves could be secured to the surfaces of the rotatable member 20. Also, if desired, the bearing sleeves could be slidable with respect to both the surfaces.

The bearing sleeves 371-375 are preferably formed of a high PV material having a low coefficient of sliding friction such as CELAZOLE TM. In the assembled state, the sleeves 371-375 contact the rotatable member along a contact surface. In the arrangement shown in FIG. 1, the contact surface with the first bearing sleeve 371, the third bearing sleeve 373 and the fifth bearing sleeve 375 is below the shaft (as depicted) and the contact surface with the second bearing sleeve 372 and fourth bearing sleeve 374 is above the shaft 5. By virtue of this construction, load transmitted through the bearing assembly is transmitted through and distributed among the radially spaced bearing surfaces. In the example shown in FIG. 1, forces acting on the shaft supported by the bearing are reacted by and distributed amongst five bearing surfaces. This results in a significant increase in bearing load carrying capability. In particular, since the load experienced at each bearing sleeve is much less than with a single sleeve, the capacity i.e., the load at which the PV limit is reached, is significantly increased.

Figure 2:
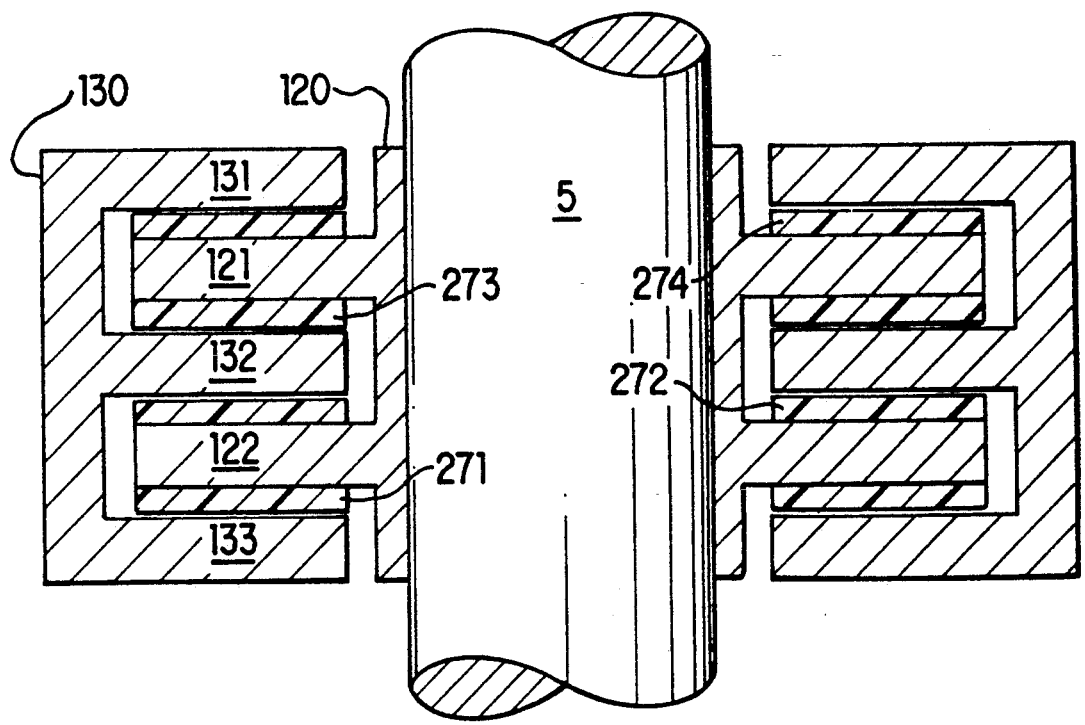
FIG. 2 is an assembled axial section of a thrust bearing according to the present invention.

FIG. 2 shows a thrust bearing assembly according to the present invention for supporting a shaft 5 for rotation within a housing (not shown in FIG. 2). The assembly comprises a rotatable member 120 and a non-rotatable member 130. The rotatable member 120 includes a number of radially outward extending disk-like cylindrical extensions 121 and 122. The non-rotatable member 130 includes a plurality, in this case, three, of radially inward extending disk-like cylindrical extensions 131, 132 and 133.

In the assembled state shown in FIG. 2, the extensions 121 and 122 of the non-rotatable member are interlocked with the extensions 131, 132 and 133 of the non-rotatable member as shown.

Annular disk-like bearing inserts 271, 272, 273 and 274 are provided on the surfaces of the disk-like extensions 121 and 122 of the rotatable member so as to provide a bearing between contacting surfaces of the rotatable member 120 and the non-rotatable member 130. In the assembly shown in FIG. 2, it should be appreciated that there would only be two surfaces in contact at any one time.

By virtue of this construction, thrust transmitted through the bearing assembly is transmitted through and distributed among two spaced bearing surfaces. This results in a significant increase in total bearing area. Moreover, it should be readily appreciated that the design can be extended by providing additional extensions on the rotatable and non-rotatable member so as to further increase bearing surface area if desired. This in turn improves the capacity of the bearing i.e., the load at which the bearing surfaces reach their PV limit.

The bearing sleeves are again, preferably formed of a high PV material with a low coefficient of sliding friction such as CELAZOLE ™.

I claim:

1. A bearing assembly, the bearing assembly comprising:
   a non-rotatable member having an outer periphery adapted to be mounted in a housing, the non-rotatable member further comprising a plurality of radially spaced coaxial extensions; a rotatable member having a plurality of radially spaced coaxially extending cylindrical surfaces supported on the extensions of the non-rotatable member for rotation relative to the non-rotatable member, and a bearing sleeve supporting each cylindrical surface of the rotatable member on an extension of the non-rotatable member such that torque loads are distributed among the bearing sleeves so as to increase the total bearing surface area.

2. The bearing of claim 1, wherein the bearing assembly includes at least three bearing sleeves.

3. The bearing of claim 1, wherein the bearing sleeves are formed of a plastic material having a low coefficient of friction and high PV secured to one of the non-rotatable member and the rotatable member.

4. The bearing of claim 3, wherein the bearing sleeves are formed integrally with one of the non-rotatable member and the rotatable member.

5. A bearing for supporting a shaft for rotation in a housing, the bearing comprising:
   a non-rotatable member including a plurality of radially spaced coaxial extensions, the plurality of extensions including a radially outermost extension and a radially innermost extension, the radially outermost extension being secured to the housing;
   a cylindrical rotatable member which includes a plurality of coaxial radially spaced cylindrical extensions, the plurality of cylindrical extensions including a radially outermost extension and a radially innermost extension, the radially inner most surface being secured to the shaft for rotation therewith;
   the rotatable member and the non-rotatable member being radially interlocked such that the cylindrical extensions of the rotatable member and the extensions of the non-rotatable member axially overlap one another, each extension being supported on, and for rotational movement relative to, the extension which it overlaps by a bearing sleeve so as to allow rotation of the rotatable member relative to the non-rotatable member.

6. The bearing of claim 5, wherein the bearing sleeves supporting the overlapping extensions are sleeve bearings formed of a material having a low coefficient of sliding friction.

7. The bearing of claim 6, wherein the sleeve bearings are formed of a plastic material having a high PV.

8. The bearing of claim 7, wherein the sleeve bearings are formed integrally from the same material as one of the rotatable member and the non-rotatable member.

9. A bearing for supporting a shaft for rotation in a housing, the bearing comprising:
   a non-rotatable member secured to the housing;
   a plurality of non-rotatable extensions, each extension having two sides and two edges, one edge being connected to the non-rotatable member and the other edge being spaced from the non-rotatable member, the two sides extending between the two edges, the sides of adjacent extensions being spaced from one another;
   a rotatable member rotatably mounted on the non-rotatable portion, the rotatable member secured to the shaft for rotation therewith;
   at least one rotatable extension secured to the rotatable member, the extension having two sides and two edges, one of the edges being connected to the rotatable member and the other edge being spaced from the rotatable member, the sides extending between the edge, the extension extending into a space between adjacent non-rotatable extensions so that the sides of the rotatable extension overlap the sides of the non-rotatable extension; and
   a plurality of bearing inserts formed of a plastic material, each bearing insert being located between overlapping sides of the rotatable and non-rotatable extensions to support the rotatable member for rotation relative to the non-rotatable member whereby a bearing insert is provided at both sides of at least one extension.

10. The bearing of claim 9, wherein the non-rotatable member includes a plurality of coaxial radially spaced extensions and the rotatable member includes a plurality of coaxial radially spaced extension and wherein the extensions of the non-rotatable member interlock with the extensions of the rotatable member such that the extensions overlap one another so as to provide a series of radially spaced bearing surfaces and wherein a bearing insert is located at each such bearing surface to support the rotatable member for rotation relative to the non-rotatable member.

11. The bearing of claim 10, wherein the bearing inserts are formed of a plastic material having a high PV.

12. The bearing of claim 9, wherein the bearing is a thrust bearing comprising a non-rotatable member having a plurality of radially extending axially spaced annular extensions and a rotatable member having a plurality of radially extending axially spaced annular extensions interlocked with the extensions of the non-rotatable member so as to provide a plurality of pairs of overlapped annular extensions; a plurality of annular bearing inserts, each bearing insert being secured to one of the non-rotatable member and the rotatable member and located between a pair of over lapping annular extensions.

13. The bearing of claim 12, wherein the bearing inserts are formed integrally from the same material as one of the rotatable member and the non-rotatable member.

14. The bearing of claim 9, wherein the bearing is a radial bearing comprising a rotatable member having a plurality of radially spaced coaxial extensions and a non-rotatable member having a plurality of radially spaced coaxial extensions interlocked with the coaxial extensions of the rotatable member so as to provide a plurality of pairs of overlapping coaxial extensions; a bearing insert sleeve provided between each pair of overlapping coaxial extensions to support the rotatable member for rotation relative to the non-rotatable member.

15. The bearing of claim 14, wherein the bearing inserts are formed integrally from the same material as one of the rotatable members and the non-rotatable member.

* * * * *